United States Patent
Suzuki et al.

(10) Patent No.: US 7,071,653 B2
(45) Date of Patent: Jul. 4, 2006

(54) METHOD FOR CHARGING A NON-AQUEOUS ELECTROLYTE SECONDARY BATTERY AND CHARGER THEREFOR

(75) Inventors: Kohei Suzuki, Yao (JP); Masato Fujikawa, Kadoma (JP); Hideharu Takezawa, Katano (JP); Katsumi Kozu, Sanda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 280 days.

(21) Appl. No.: 10/850,114

(22) Filed: May 21, 2004

(65) Prior Publication Data

US 2004/0241534 A1     Dec. 2, 2004

(30) Foreign Application Priority Data

May 30, 2003    (JP)   ............................ 2003-154320

(51) Int. Cl.
*H02J 7/00*      (2006.01)
(52) U.S. Cl. .................................................. 320/128
(58) Field of Classification Search ................ 320/128; 429/231.8, 231.9, 330–332, 341
See application file for complete search history.

(56) References Cited

U.S. PATENT DOCUMENTS 6,424,517 B1 * 7/2002 Ikeda et al. .................. 361/502
6,746,799 B1 * 6/2004 Yamada et al. ............. 429/221
6,884,546 B1 * 4/2005 Fujita et al. ............. 429/231.9

FOREIGN PATENT DOCUMENTS

| JP | 07014613 | 1/1995 |
| JP | 08033221 | 2/1996 |
| JP | 2000188132 | * 7/2000 |
| JP | 2003036891 | 2/2003 |

* cited by examiner

*Primary Examiner*—Pia Tibbits
(74) *Attorney, Agent, or Firm*—Stevens, Davis, Miller & Mosher, LLP (57) ABSTRACT

A method for charging a non-aqueous electrolyte secondary battery, the battery comprising a positive electrode that comprises a lithium-containing composite oxide, a negative electrode, and a non-aqueous electrolyte. The method comprises the step of detecting an open-circuit-voltage of the battery to determine which of voltage regions A, B and C the detected value is included in. The region A is not smaller than a prescribed value X. The region B is smaller than the prescribed value X and larger than a prescribed value Y (Y<X). The region C is not larger than the value Y. According to the determination, charging is stopped when the detected value is included in the region A, charging is conducted when the detected value is included in the region B, or discharging is conducted until a closed-circuit-voltage of the battery becomes not larger than a prescribed value Z and then charging is conducted, when the detected value is included in the region C.

14 Claims, 5 Drawing Sheets

METHOD FOR CHARGING A NON-AQUEOUS ELECTROLYTE SECONDARY BATTERY AND CHARGER THEREFOR

BACKGROUND OF THE INVENTION

In the field of secondary batteries comprising an alkaline aqueous electrolyte, as a means for eliminating a memory effect (inactivation) caused by phase transition of nickel hydroxide to be used as a positive electrode active material, a method known is auto-discharging a secondary battery compulsorily after setting the battery in a charger (e.g. Japanese Laid-Open Patent Publication No. Hei 7-14613, Japanese Laid-Open Patent Publication No. Hei 8-33221).

In the field of secondary batteries comprising a non-aqueous electrolyte (non-aqueous electrolyte secondary batteries), on the other hand, such a defect as the memory effect is not recognized in materials used for the electrodes thereof. Therefore, in a typical method for charging a non-aqueous electrolyte secondary battery, after a battery is set in a charger, a voltage of the battery is measured and if the measured voltage is smaller than a charge terminal voltage and larger than a low voltage indicative of a short-circuit, charging is immediately started.

In recent years, application of non-aqueous electrolyte secondary batteries as main power sources chiefly for mobile phones has been expanding. With such expanded application of non-aqueous electrolyte secondary batteries, it has been becoming clearer that, when a non-aqueous electrolyte secondary battery with a large remaining capacity is charged, the battery capacity deteriorates in a large degree. The cause of the capacity deterioration has been understood as follows although the details thereof are unclear.

In a lithium-ion secondary battery, a negative electrode is larger in size than a positive electrode. In the case of a lithium-ion secondary battery being stood still in a charged state, therefore, lithium ion having been absorbed in a negative electrode diffuse in a position of the negative electrode, which is not opposed to a positive electrode. The lithium ion thus having diffused are considered as becoming incapable of contributing to discharging (Japanese Laid-Open Patent Publication No. 2003-36891).

Japanese Laid-Open Patent Publication No. 2003-36891 has proposed a method where, in order to suppress deterioration in capacity of a non-aqueous electrolyte secondary battery, measurements of a battery voltage, constant-current discharge and standing-still of the battery after the discharge are repeated, and once the battery voltage becomes not larger than a prescribed voltage, charging is conducted. This method however has the following problem.

In the case where batteries are auto-discharged compulsorily until becoming not larger than a prescribed value in voltage across the board, there may be no problem when a remaining capacity of the battery is small. When a remaining capacity is large, however, the time required for the auto-discharge becomes longer, thereby raising a problem of a longer period of time to complete charging. It is not rare that a secondary battery with a remaining capacity of 80% or larger is set in a charger. In view of usability of customers, the aforementioned method is not practical.

Moreover, across-the-board compulsory auto-discharging naturally causes an increase in number of repetition of charge/discharge cycles. This may consequently induce capacity deterioration based on another factors, such as deterioration in active material. Hence, it becomes impossible to realize improvement of a cycle life characteristic of a battery.

Furthermore, auto-discharging a battery with a large remaining capacity can be regarded as being equivalent to wasting a large amount of energy. Therefore, such a method cannot be recommendable in the modern society with plenty of environmental and energy problems.

BRIEF SUMMARY OF THE INVENTION

The present invention was made in view of the aforementioned problems and relates to a method for charging a non-aqueous electrolyte secondary battery, and a charger therefor, which allow improvement in cycle life characteristic of a non-aqueous electrolyte secondary battery.

Namely, the present invention relates to a method (hereinafter also referred to as a charging method X) for charging a non-aqueous electrolyte secondary battery, the battery comprising a positive electrode that comprises a lithium-containing composite oxide as an active material, a negative electrode that comprises a material capable of absorbing and desorbing lithium ion as an active material, and a non-aqueous electrolyte, the method comprising the steps of: (a) detecting an open-circuit-voltage of the secondary battery to determine which of voltage regions A, B and C the detected value is included in, the voltage region A being not smaller than a prescribed value X, the voltage region B being smaller than the prescribed value X and larger than a prescribed value Y (Y<X), and the voltage region C being not larger than the prescribed value Y; and (b) according to the determination, [i] stopping charging when the detected value is included in the region A, [ii] conducting charging when the detected value is included in the region B, or [iii] conducting discharging until a closed-circuit-voltage of the secondary battery becomes not larger than a prescribed value Z and then conducting charging, when the detected value is included in the region C.

The present invention also relates to a method (hereinafter also referred to as a charging method Y) for charging a plurality of non-aqueous electrolyte secondary batteries connected in series, each secondary battery comprising a positive electrode that comprises a lithium-containing composite oxide as an active material, a negative electrode that comprises a material capable of absorbing and desorbing lithium ion, and a non-aqueous electrolyte, the method comprising the steps of: (a) detecting an open-circuit-voltage of at least one of the secondary batteries to determine which of voltage regions A, B and C the detected value is included in, the voltage region A being not smaller than a prescribed value X, the voltage region B being smaller than the prescribed value X and larger than a prescribed value Y (Y<X), and the voltage region C being not larger than the prescribed value Y; and (b) according to the determination, [i] stopping charging when any detected value is included in the region A, [ii] conducting charging when all of the detected values are included in the region B, or [iii] conducting discharging until a closed-circuit-voltage of any of the secondary batteries becomes not larger than a prescribed value Z and then conducting charging, when any detected value is included in the region C.

The present invention also relates to a charger (hereinafter also referred to as a charger X) for charging a non-aqueous electrolyte secondary battery, the battery comprising a positive electrode that comprises a lithium-containing composite oxide as an active material, a negative electrode that comprises a material capable of absorbing and desorbing lithium ion, and a non-aqueous electrolyte, the charger comprising: (a) a voltage detection means for detecting an open-circuit-voltage of the secondary battery, (b) a determination means for determining which of voltage regions A, B and C the detected value is included in, the voltage region A being not smaller than a prescribed value X, the voltage region B being smaller than the prescribed value X and larger than a prescribed value Y (Y<X), and the voltage region C being not larger than the prescribed value Y, and (c) a selective charging means for, according to the determination, [i] stopping charging when the detected value is included in the region A, [ii] conducting charging when the detected value is included in the region B, or [iii] conducting discharging until a closed-circuit-voltage of the secondary battery becomes not larger than a prescribed value Z and then conducting charging, when the detected value is included in the region C.

The present invention further relates to a charger (hereinafter also referred to as a charger Y) for charging a plurality of non-aqueous electrolyte secondary batteries connected in series, each secondary battery comprising a positive electrode that comprises a lithium-containing composite oxide as an active material, a negative electrode that comprises a material capable of absorbing and desorbing lithium ion, and a non-aqueous electrolyte, the charger comprising: (a) a voltage detection means for detecting an open-circuit-voltage of at least one of the secondary batteries, (b) a determination means for determining which of voltage regions A, B and C the detected value is included in, the voltage region A being not smaller than a prescribed value X, the voltage region B being smaller than the prescribed value X and larger than a prescribed value Y (Y<X), and the voltage region C being not larger than the prescribed value Y, and (c) a selective charging means for, according to the determination, [i] stopping charging when any detected value is included in the region A, [ii] conducting charging when all of the detected values are included in the region B, or [iii] conducting discharging until a closed-circuit-voltage of any of the secondary batteries becomes not larger than a prescribed value Z and then conducting charging, when any detected value is included in the region C.

In the chargers X and Y, two or more of the voltage detection means, the determination means and the selective charging means may be incorporated in one device.

The prescribed value X is suitably a value recommended as a charge terminal voltage of the secondary battery, with a margin of ±0.03 V.

The prescribed value X is suitably a nominal voltage of the secondary battery with a margin of ±1%.

The prescribed value Y is suitably a value when a remaining capacity of the secondary battery is 20% or lower of a nominal capacity.

The prescribed value Z is suitably not smaller than 2.7 V and not larger than 2.9 V.

In the charging method X, it is preferable that charging be stopped when a closed-circuit-voltage of the secondary battery reaches the prescribed value X.

In the charging method Y, it is preferable that charging be stopped when a closed-circuit-voltage of any of the secondary batteries reaches the prescribed value X.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

One embodiment of the present invention is described below with reference to drawings.

Figure 1:
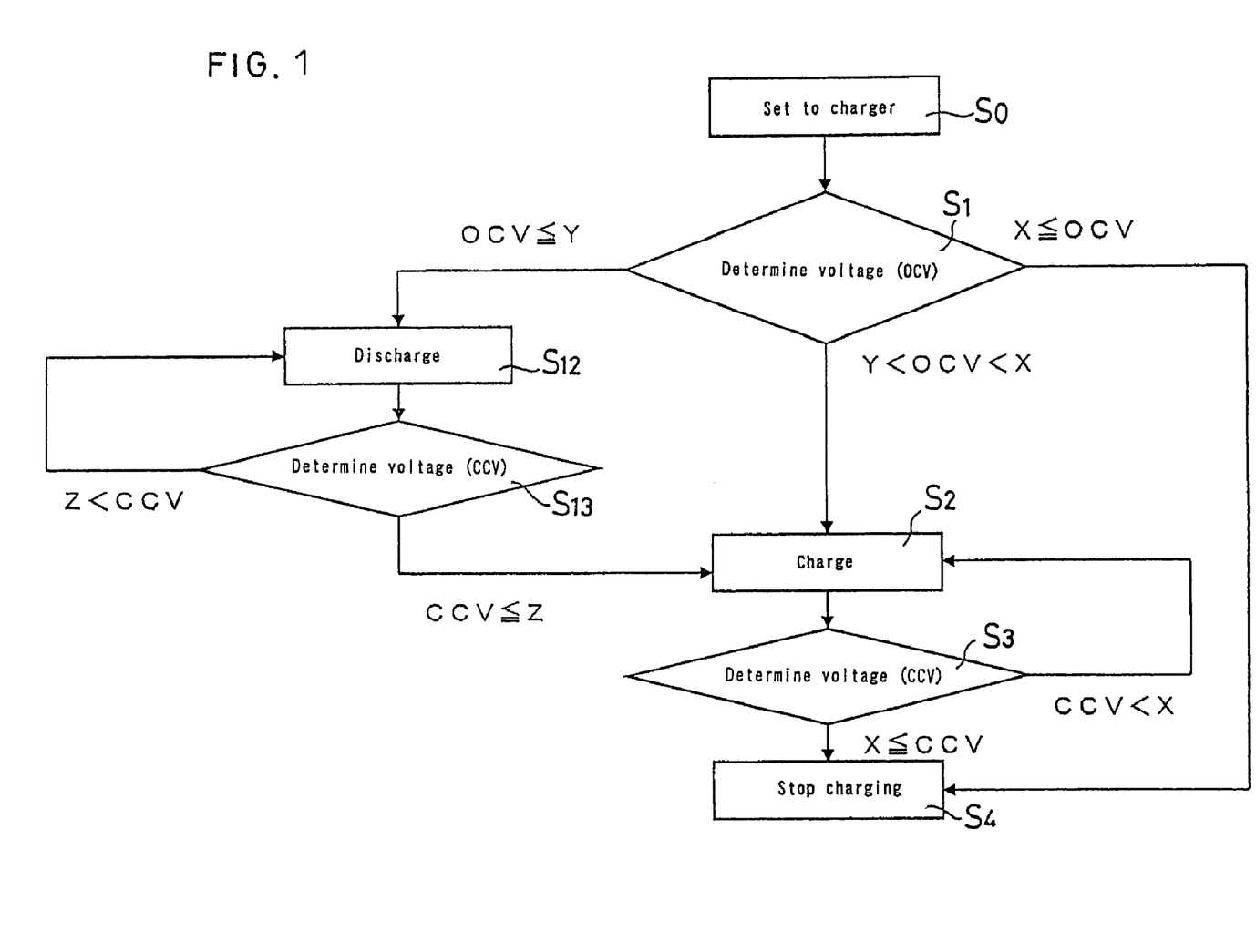
FIG. 1 is a flowchart for explaining a method for charging a non-aqueous electrolyte secondary battery in accordance with one embodiment of the present invention.
Figure 2:
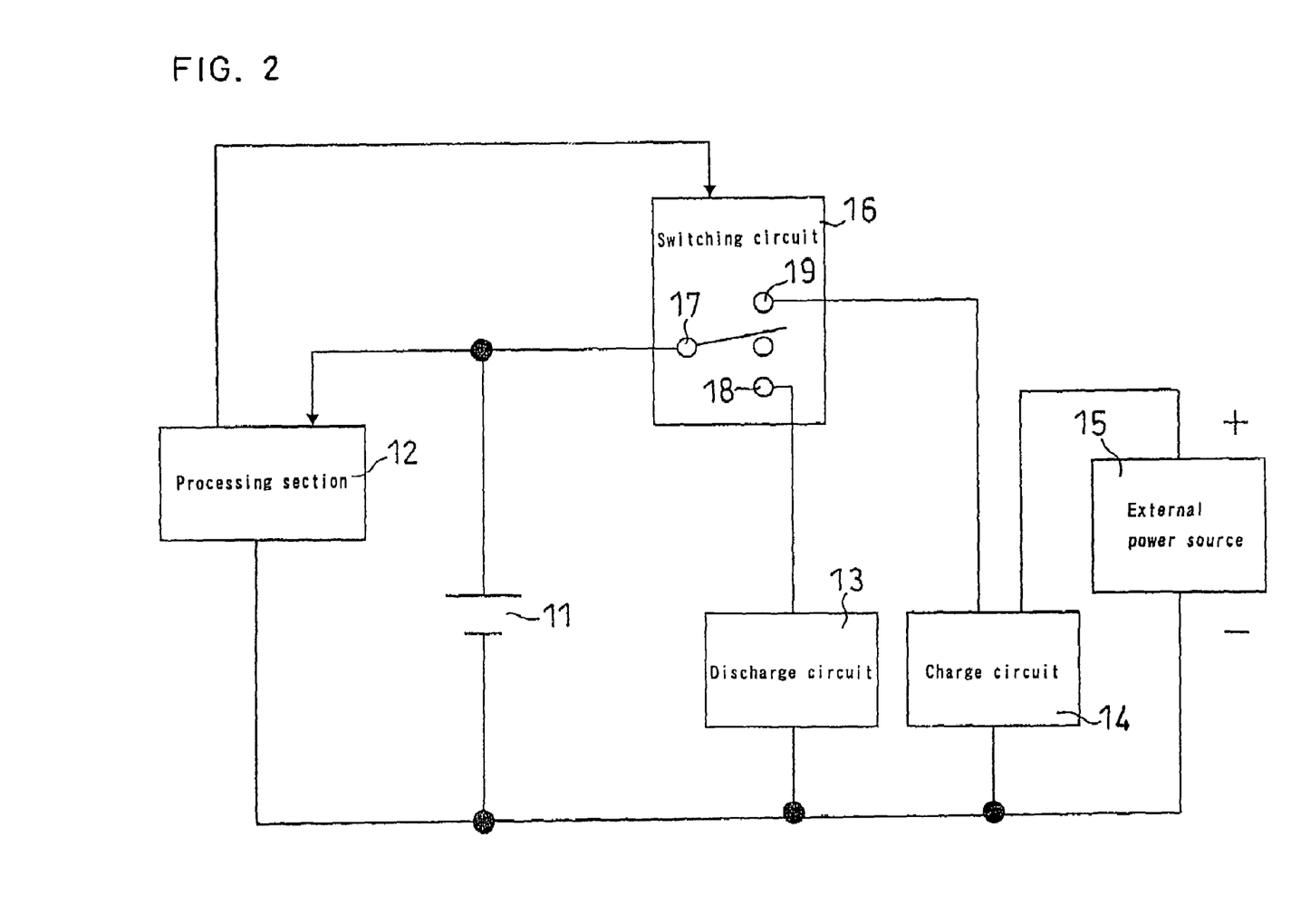
FIG. 2 is a circuit diagram of a charger to implement the method for charging a non-aqueous electrolyte secondary battery in accordance with one embodiment of the present invention.

FIG. 1 is a flowchart for explaining a method for charging a non-aqueous electrolyte secondary battery. FIG. 2 is a circuit diagram of a charger. This circuit comprises a discharge circuit 13 and a charge circuit 14. As a non-aqueous electrolyte secondary battery 11 is set in the charger, the secondary battery 11 is connected in parallel to a processing section 12 that comprises a voltage detecting section for detecting an open-circuit-voltage of the battery. The processing section 12 comprises a determination section such as a determination circuit for determining which of voltage regions A, B and C the detected voltage value is included in, the voltage region A being not smaller than a prescribed value X, the voltage region B being smaller than said prescribed value X and larger than a prescribed value Y (Y<X), and the voltage region C being not larger than said prescribed value Y.

The charge circuit 14 and an external power source 15 constitute a closed circuit. In charging the secondary battery 11, the charge circuit 14 and the secondary battery 11 constitute a closed circuit by the motion of a switching circuit 16. As a result, the secondary battery 11 constitutes a closed circuit, together with the external power source 15 via the charge circuit 14. In discharging the secondary battery 11, on the other hand, the discharge circuit 13 and the secondary battery 11 constitute a closed circuit by the motion of the switching circuit 16.

A negative electrode of the secondary battery 11, a negative-electrode-side terminal of the discharge circuit 13 and a negative-electrode-side terminal of the charge circuit 14 respectively have the same electric potentials as that of the negative electrode terminal of the external power source 15. A positive electrode of the secondary battery 11, a positive-electrode-side terminal of the discharge circuit 13 and a positive-electrode-side terminal of the charge circuit 14 are respectively connected to prescribed terminals 17, 18 and 19 in the switching circuit 16.

The switching circuit 16 comprises a discharge switch for controlling the connection between the positive electrode of the secondary battery 11 and the positive-electrode-side terminal of the discharge circuit 13, and a charge switch for controlling the connection between the positive electrode of the secondary battery 11 and the positive-electrode-side terminal of the charge circuit 14. When the discharge switch is turned on, the positive electrode of the secondary battery 11 and the positive-electrode-side terminal of the discharge circuit 13 are connected to each other; when the discharge switch is turned off, the connection is cut off. When the charge switch is turned on, the positive electrode of the secondary battery 11 and the positive-electrode-side terminal of the charge circuit 14 are connected to each other; when the charge switch is turned off, the connection is cut off.

The switching circuit 16 communicates mutually with the voltage detecting section for detecting a voltage of the secondary battery 11, and the processing section 12 having a determination section for determining which of voltage regions A, B and C the detected value is included in. The switching circuit 16 is controlled according to determination results in the determination section. It is to be noted that the switching circuit 16 may comprise the determination section, and in that case, the information of the detected voltage value is conveyed as it is, to the switching circuit 16.

When the discharge switch of the switching circuit 16 is turned on, and the positive electrode of the secondary battery 11 and the positive-electrode-side terminal of the discharge circuit 13 are connected to each other, the discharge circuit 13 allows the secondary battery 11 discharged until the closed-circuit-voltage thereof becomes not larger than a prescribed value Z. The closed-circuit-voltage of the secondary battery 11 during the discharge is monitored by the discharge circuit 13 or the processing section 12. At the point where the voltage becomes not larger than the prescribed value Z, the discharge switch is turned off so that the connection between the positive electrode of the secondary battery 11 and the positive-electrode-side terminal of the discharge circuit 13 is cut off.

In the meantime, when the charge switch of the switching circuit 16 is turned on, and the positive electrode of the secondary battery 11 and the positive-electrode-side terminal of the charge circuit 14 are connected to each other, the charge circuit 14 allows the secondary battery 11 charged until the closed-circuit-voltage thereof reaches a prescribed value. The closed-circuit-voltage of the secondary battery 11 during the charge is monitored by the charge circuit 14 or the processing section 12. When the voltage reaches the prescribed value, the charge switch is turned off so that the connection between the positive electrode of the secondary battery 11 and the positive-electrode-side terminal of the charge circuit 14 is cut off.

For stopping both charging and discharging, both the charge and discharge switches are turned off.

In the case where the switching circuit 16 comprises a controlling section for controlling the aforementioned switch function, necessary information is input into the controlling section from the processing section 12 or the like.

It should be noted that the voltage detecting section, the determination section and the controlling section can be constituted by a microcomputer, a wired logic circuit, or the like.

Next, one example of methods for charging a non-aqueous electrolyte secondary battery in accordance with the present invention is explained with reference to the flowchart in FIG. 1, taking the case of using the aforementioned charger for example.

First, the secondary battery 11 is set in the charger ($S_0$). With both the charge/discharge switches of the switching circuit 16 held off, the voltage detecting section of the processing section 12 detects an open-circuit-voltage of the secondary battery 11.

Subsequently, the determination section of the processing section 12 determines which of voltage regions A, B and C the detected value (OCV) is included in ($S_1$). The voltage region A is not smaller than a prescribed value X. The voltage region B is smaller than the prescribed value X and larger than a prescribed value Y. The voltage region C is not larger than the prescribed value Y.

As a result of the determination, when $X \leq OCV$, the secondary battery 11 is considered as being in a fully charged state. In that case, since charging is no longer necessary, the switching circuit 16 stops charging. At this time, both the charge and discharge switches are held off.

Further, when $Y<OCV<X$, the switching circuit 16 allows the charge switch turned on and the discharge switch turned off. This leads to the start of charging ($S_2$).

After a lapse of a prescribed time from the start of charging, a closed-circuit-voltage (CCV) of the secondary battery 11 is measured ($S_3$). When the CCV has not reached the prescribed value X, charging is started again. When the CCV has reached the prescribed value X, on the other hand, charging is stopped ($S_4$). The steps $S_2$ and $S_3$ are repeated until the CCV reaches the prescribed value X.

In the step $S_1$, as a result of the determination, the switching circuit 16 allows the charge switch turned off and the discharge switch turned on when $OCV \leq Y$. This leads to the start of discharging ($S_{12}$).

After a lapse of a prescribed time from the start of discharging, a closed-circuit-voltage (CCV) of the secondary battery 11 is measured ($S_{13}$). When the CCV has not reached a prescribed value Z, discharging is started again. When the CCV has reached the prescribed value Z, on the other hand, the switching circuit 16 allows the charge switch turned on and the discharge switch turned off. This leads to the start of charging ($S_2$). The steps $S_{12}$ and $S_{13}$ are repeated until the CCV reaches the prescribed value Z.

The prescribed value X is suitably a value recommended as a charge terminal voltage of the secondary battery, with a margin of ±0.03 V. Further, a value equivalent to a nominal voltage of the secondary battery with a margin of ±1% can be employed as the prescribed value X.

Further, it is preferable that the prescribed value Y be determined based on a remaining capacity with respect to a nominal capacity of the secondary battery. It should be noted that a nominal capacity is typically determined by conducting constant-current constant-voltage charge of a battery at 20° C., and then conducting a constant-current discharge of the battery. Specifically, a battery is charged in the same conditions as in the case of determining a nominal capacity, and then the battery is discharged in the same conditions as in the case of determining the normal capacity until a remaining capacity reaches 20% of the nominal capacity. The prescribed value Y is preferably not larger than a voltage when the remaining capacity as thus obtained is 20% of the nominal capacity. Moreover, in view of reducing the time required for refreshment, the prescribed value Y is preferably not larger than a voltage when the remaining capacity is 10% of the nominal capacity.

When the prescribed value Y is set to too large a value, the number of charging a secondary battery with a large remaining capacity increases, thereby reducing the effect of preventing deterioration in capacity due to the repetition of charge/discharge cycles. The suitable prescribed value Y is a value when the remaining capacity is 0% and not larger than 20% of a nominal capacity.

Further, the suitable prescribed value Z is not smaller than 2.7 V and not larger than 2.9 V from the viewpoint of preventing overdischarge of the secondary battery. When the prescribed value Z is larger than 2.9 V, the effect of the refresh discharge decreases; when it is smaller than 2.7 V, the battery is overdischarged, thereby causing deterioration in battery characteristic.

Figure 3:
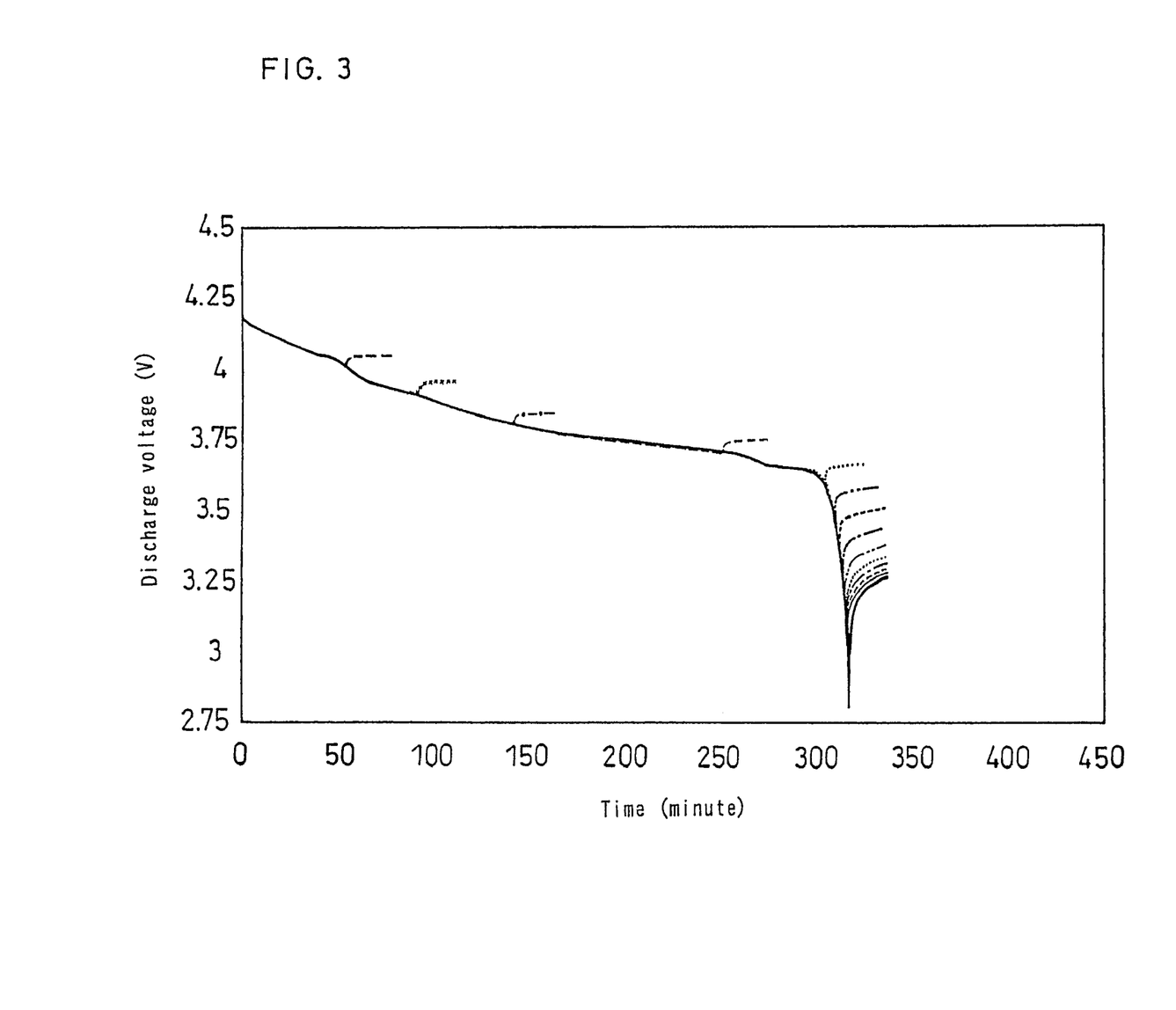
FIG. 3 is a graph showing a discharge curve of a lithium-ion secondary battery, comprising a positive electrode that comprises lithium cobaltate as a positive electrode active material and a negative electrode that comprises graphite as a negative electrode active material, at a current of 0.2 C.

FIG. 3 shows a discharge curve of a lithium-ion secondary battery (hereinafter referred to as a battery P), comprising a positive electrode that comprises lithium cobaltate as a positive electrode active material and a negative electrode that comprises graphite as a negative electrode active material, at a current of 0.2 C. Herein, in charging, a constant-current charging was conducted at a constant current of 1 C until the voltage reached 4.2 V, and then a constant-voltage charging was conducted until the current reached 0.05 C. The nominal capacity of the battery P is 850 mAh, and a current of 0.2 C is 170 mA. It should be noted that the nominal capacity is determined based on a theoretical capacity determined from the positive electrode active material amount.

It is found from FIG. 3 that, when the battery P in a fully charged state is discharged at a current of 0.2 C for about 240 minutes, namely when the remaining capacity is 20% of the nominal capacity, the OCV is around 3.75 V. It can therefore be said that the suitable prescribed value Y is for example not larger than 3.75 V.

It is to be noted that lithium-containing composite oxides to be used as a positive electrode active material of a non-aqueous electrolyte secondary battery other than lithium cobaltate may include $LiNiO_2$, $LiMn_2O_4$ and the like, but not limited to those.

As for the material capable of absorbing and desorbing lithium ion as a negative electrode active material, carbon materials, such as graphite, graphitizable carbon, non-graphitizable carbon and carbon fiber, are preferred. Moreover, as graphite, various sorts of artificial graphite and natural graphite have been in use. In charging/discharging a battery, a potential curve of a negative electrode comprising graphite is relatively even. For this reason, the state of a battery during charging and discharging is easy to detect with respect to the potential of the opposing positive electrode, and charge/discharge can be controlled relatively with ease.

Next, one example of the cases of simultaneously charging a plurality of non-aqueous electrolyte secondary batteries is described.

Figure 4:
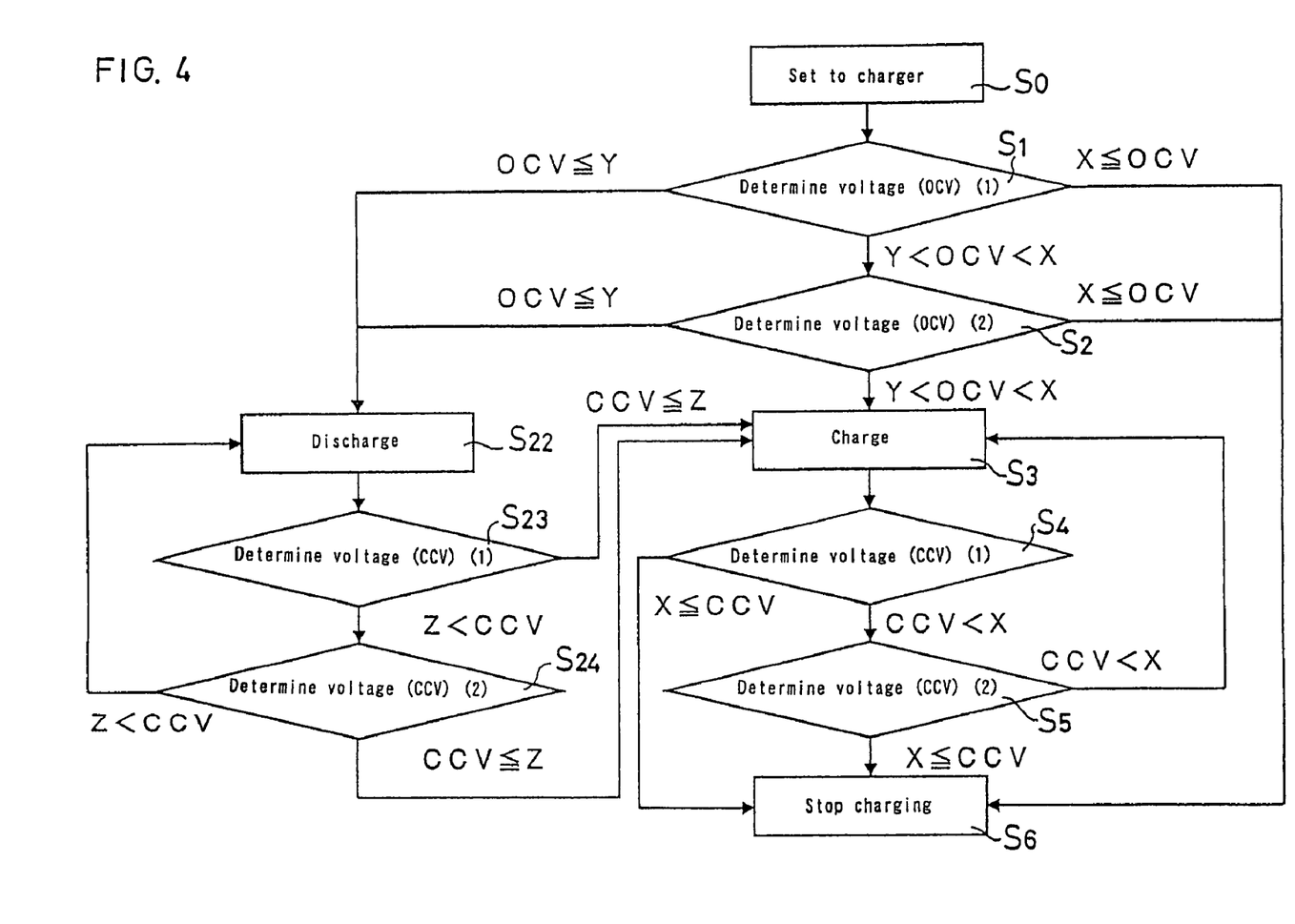
FIG. 4 is a flowchart for explaining a method for charging a plurality of non-aqueous electrolyte secondary batteries in accordance with one embodiment of the present invention.
Figure 5:
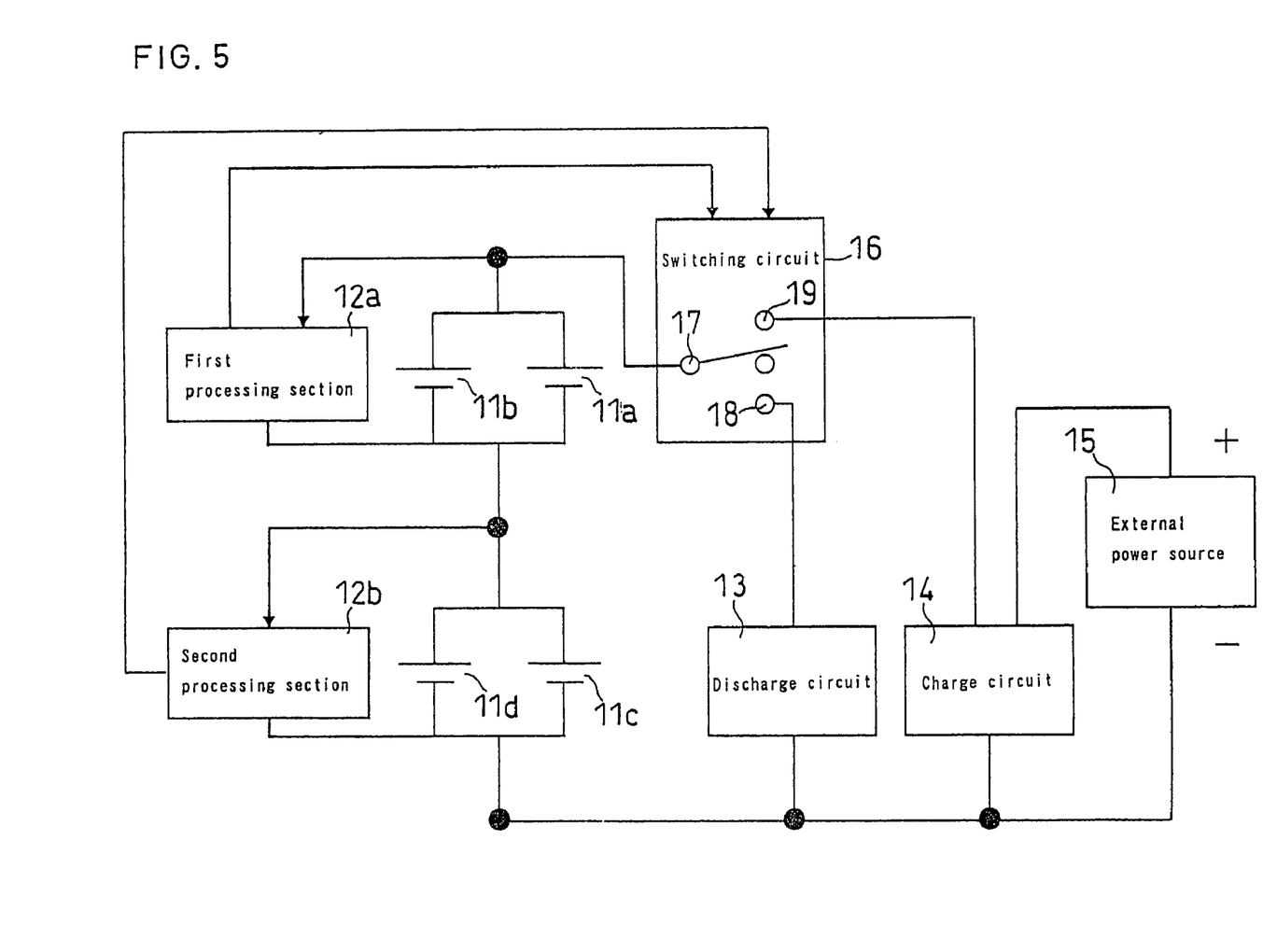
FIG. 5 is a circuit diagram of a charger to implement the method for charging a plurality of non-aqueous electrolyte secondary batteries in accordance with one embodiment of the present invention.

FIG. 4 is a flowchart for explaining a method for charging a plurality of non-aqueous electrolyte secondary batteries; FIG. 5 is a circuit diagram of a charger. It is to be noted that the constitutional elements in FIG. 5 having the same functions as the constitutional elements in the charger shown in FIG. 2 are put the same numbers as in FIG. 2.

This circuit shows the case of simultaneously charging secondary batteries arranged such that two battery combinations are connected in series, each combination comprising two parallely connected batteries.

Two parallely connected secondary batteries 11a and 11b are connected in parallel to a first processing section 12a that comprises a first voltage detecting section for detecting the open circuit voltage thereof. Similarly, two parallely connected secondary batteries 11c and 11d are connected in parallel to a second processing section 12b that comprises a second voltage detecting section for detecting the open circuit voltages thereof.

The combination of the secondary batteries 11a and 11b and the combination of the secondary batteries 11c and 11d are connected in series.

The first processing section 12a and the second processing section 12b respectively comprise a first determination section and a second determination section, to determine which of voltage regions A, B and C each detected voltage value is included in.

Herein, the two parallely connected secondary batteries in combination are regarded as one secondary battery. Namely, in the present invention, a plurality of parallely connected secondary batteries are handled with as one secondary battery. This means that the present invention includes a method for charging a plurality of parallely connected secondary batteries and a charger therefor, and does not exclude such a method and a charger.

The first processing section 12a and the second processing section 12b communicate mutually with the switching circuit 16. The results of the determination in the first and the second voltage detecting sections are conveyed to the switching circuit 16.

It should be noted that the switching circuit 16 may comprise the determination section such as the determination circuit. In that case, a detected value of an open circuit voltage is conveyed as it is, to the switching circuit 16. The circuit in FIG. 5 has the same configuration as the circuit in FIG. 2 except for what was described above.

Next, one example of the methods for charging a plurality of non-aqueous electrolyte secondary batteries in accordance with the present invention is described with reference to the flowchart in FIG. 4, taking the case of using the aforementioned charger as an example.

First, the secondary batteries 11a to 11d are set in the charger ($S_0$). With both the charge/discharge switches of the switching circuit 16 held off, the first voltage detecting section of the first processing section 12a measures an open-circuit-voltage of the combination comprising parallely connected secondary batteries 11a and 11b.

Subsequently, the determination section of the first processing section 12a determines which of voltage regions A, B, and C the detected voltage value (OCV) is included in ($S_1$). The voltage region A is not smaller than a prescribed value X. The voltage region B is smaller than the prescribed value X and larger than a prescribed value Y. The voltage region C is not larger than the prescribed value Y.

As a result of the determination, when $X \leq OCV$, the combination comprising parallely connected secondary batteries 11a and 11b is considered as being in a fully charged state, and further charging would lead to overcharging. For this reason, charging is stopped by the switching circuit 16. At this time, both the charge and discharge switches are held off.

When Y<OCV<X, on the other hand, the second voltage detecting section of the second processing section 12b measures an open circuit voltage of the combination comprising parallely connected secondary batteries 11c and 11d and the determination section of the second processing section 12b determines a detected value ($S_2$).

As a result of the determination, when $X \leq OCV$, the combination comprising parallely connected secondary batteries 11c and 11d is considered as being in a fully charged state, and further charging would lead to overcharging. For this reason, charging is stopped by the switching circuit 16. At this time, both the charge and discharge switches are held off.

When the detected value in the second detecting section is Y<OCV<X, neither of the two combinations comprising parallely connected secondary batteries are in a fully charged state. It is therefore possible to further conduct charging. Moreover, none of the secondary batteries 11a to 11d is overcharged so long as charging is stopped at the point where a voltage of either of the two combinations comprising parallely connected secondary batteries reaches the prescribed value X.

At this time, the switching circuit 16 allows the charge switch turned on and the discharge switch turned off. As a result, the charge circuit 14 starts charging the secondary batteries 11a to 11d ($S_3$).

After a lapse of a prescribed time from the start of charging, a closed-circuit-voltage (CCV) of the combination comprising parallely connected secondary batteries 11a and 11b is measured ($S_4$). When the CCV has reached the prescribed value X, charging is stopped ($S_6$).

When the CCV has not reached the prescribed value X, on the other hand, a closed circuit voltage (CCV) of the combination comprising parallely connected secondary batteries 11c and 11d is measured to determine the detected value ($S_5$). As a result of the determination, when the CCV has reached the prescribed value X, charging is stopped ($S_6$).

On the other hand, when the CCV has not reached the prescribed value X, both of the two combinations comprising parallely connected secondary batteries have not been fully charged yet, and are thus subjected to re-charging ($S_3$). Steps $S_3$ to $S_5$ are repeated until the CCV of either of the two combinations comprising parallely connected secondary batteries reaches the prescribed value X.

In the step $S_1$ or $S_2$, as a result of the determination, when OCV≦Y, the switching circuit 16 allows the charge switch turned off and the discharge switch turned on. This leads to the start of discharging the secondary batteries 11a to 11d by the discharge circuit 13 ($S_{22}$).

After a lapse of a prescribed time from the start of discharging, a closed-circuit-voltage (CCV) of the combination comprising parallely connected secondary batteries 11a and 11b is measured to determine the detected value ($S_{23}$). When the CCV has not reached a prescribed value Z, a closed circuit voltage (CCV) of the combination comprising parallely connected secondary batteries 11c and 11d is measured in succession to determine the detected value ($S_{24}$).

On the other hand, when a closed circuit voltage (CCV) of the combination comprising parallely connected secondary batteries 11a and 11b has reached the prescribed value Z, charging is started ($S_3$).

As a result of the determination in the step $S_{24}$, when the CCV of the combination comprising parallely connected secondary batteries 11c and 11d has not reached the prescribed value Z, both of the two combinations comprising parallely connected secondary batteries have not been sufficiently refreshed yet, and are thus subjected to re-discharging ($S_{22}$). On the other hand, as a result of the determination in the step $S_{24}$, when the CCV of the combination comprising parallely connected secondary batteries 11c and 11d has reached the prescribed value Z, charging is started ($S_3$). The steps $S_{22}$ to $S_{24}$ are repeated until the CCV of either of the two combinations comprising parallely connected secondary batteries reaches the prescribed value Z.

The aforementioned method for charging a non-aqueous electrolyte secondary battery enables prevention of any battery from getting in an overdischarged or overcharged state.

According to the present invention, a non-aqueous electrolyte secondary battery can be charged effectively in terms of time and energy, and capacity deterioration of the battery due to repetition of charge/discharge cycle can be suppressed.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for charging a non-aqueous electrolyte secondary battery, said secondary battery comprising a positive electrode that comprises a lithium-containing composite oxide as an active material, a negative electrode that comprises a material capable of absorbing and desorbing lithium ion as an active material, and a non-aqueous electrolyte, said method comprising the steps of:
(a) detecting an open-circuit-voltage of said secondary battery to determine which of voltage regions A, B and C the detected value is included in,
said region A being not smaller than a prescribed value X,
said region B being smaller than said prescribed value X and larger than a prescribed value Y (Y<X), and
said region C being not larger than said prescribed value Y; and
(b) according to said determination,
[i] stopping charging when said detected value is included in said region A,
[ii] conducting charging when said detected value is included in said region B, or
[iii] conducting discharging until a closed-circuit-voltage of said secondary battery becomes not larger than a prescribed value Z and then conducting charging, when said detected value is included in said region C.

2. A method for charging a plurality of non-aqueous electrolyte secondary batteries connected in series, each secondary battery comprising a positive electrode that comprises a lithium-containing composite oxide as an active material, a negative electrode that comprises a material capable of absorbing and desorbing lithium ion as an active material, and a non-aqueous electrolyte, said method comprising the steps of:
(a) detecting an open-circuit-voltage of at least one of said secondary batteries to determine which of voltage regions A, B and C the detected value is included in,
said region A being not smaller than a prescribed value X,
said region B being smaller than said prescribed value X and larger than a prescribed value Y (Y<X), and
said region C being not larger than said prescribed value Y; and
(b) according to said determination,
[i] stopping charging when any detected value is included in said region A,
[ii] conducting charging when all of said detected values are included in said region B, or
[iii] conducting discharging until a closed-circuit-voltage of any of said secondary batteries becomes not larger than a prescribed value Z and then conducting charging, when any detected value is included in said region C.

3. The method for charging a non-aqueous electrolyte secondary battery in accordance with claim 1, wherein said prescribed value X is a value recommended as a charge terminal voltage of said secondary battery, with a margin of ±0.03 V.

4. The method for charging a non-aqueous electrolyte secondary battery in accordance with claim 1, wherein said prescribed value X is a nominal voltage of said secondary battery with a margin of ±1%.

5. The method for charging a non-aqueous electrolyte secondary battery in accordance with claim 1, wherein said prescribed value Y is a value when a remaining capacity of said secondary battery is 20% or lower of a nominal capacity.

6. The method for charging a non-aqueous electrolyte secondary battery in accordance with claim 1, wherein said prescribed value Z is not smaller than 2.7 V and not larger than 2.9 V.

7. The method for charging a non-aqueous electrolyte secondary battery in accordance with claim 2, wherein said prescribed value X is a value recommended as a charge terminal voltage of said secondary battery, with a margin of ±0.03 V.

8. The method for charging a non-aqueous electrolyte secondary battery in accordance with claim 2, wherein said prescribed value X is a nominal voltage of said secondary battery with a margin of ±1%.

9. The method for charging a non-aqueous electrolyte secondary battery in accordance with claim 2, wherein said prescribed value Y is a value when a remaining capacity of said secondary battery is 20% or lower of a nominal capacity.

10. The method for charging a non-aqueous electrolyte secondary battery in accordance with claim 2, wherein said prescribed value Z is not smaller than 2.7 V and not larger than 2.9 V.

11. The method for charging a non-aqueous electrolyte secondary battery in accordance with claim 1, wherein charging is stopped when a closed-circuit-voltage of said secondary battery reaches said prescribed value X.

12. The method for charging a non-aqueous electrolyte secondary battery in accordance with claim 2, wherein charging is stopped when a closed-circuit-voltage of any of said secondary batteries reaches said prescribed value X.

13. A charger for charging a non-aqueous electrolyte secondary battery, said secondary battery comprising a positive electrode that comprises a lithium-containing composite oxide as an active material, a negative electrode that comprises a material capable of absorbing and desorbing lithium ion as an active material, and a non-aqueous electrolyte,
said charger comprising:
(a) a voltage detection means for detecting an open-circuit-voltage of said secondary battery,
(b) a determination means for determining which of voltage regions A, B and C the detected value is included in,
said region A being not smaller than a prescribed value X,
said region B being smaller than said prescribed value X and larger than a prescribed value Y (Y<X), and
said region C being not larger than said prescribed value Y; and
(c) a selective charging means for, according to said determination,
[i] stopping charging when said detected value is included in said region A,
[ii] conducting charging when said detected value is included in said region B, or
[iii] conducting discharging until a closed-circuit-voltage of said secondary battery becomes not larger than a prescribed value Z and then conducting charging, when said detected value is included in said region C.

14. A charger for charging a plurality of non-aqueous electrolyte secondary batteries connected in series, each secondary battery comprising a positive electrode that comprises a lithium-containing composite oxide as an active material, a negative electrode that comprises a material capable of absorbing and desorbing lithium ion as an active material, and a non-aqueous electrolyte,
said charger comprising:
(a) a voltage detection means for detecting an open-circuit-voltage of at least one of said secondary batteries,
(b) a determination means for determining which of voltage regions A, B and C the detected value is included in,
said region A being not smaller than a prescribed value X,
said region B being smaller than said prescribed value X and larger than a prescribed value Y (Y<X), and
said region C being not larger than said prescribed value Y; and
(c) a selective charging means for, according to said determination,
[i] stopping charging when any detected value is included in said region A,
[ii] conducting charging when all of said detected values are included in said region B, or
[iii] conducting discharging until a closed-circuit-voltage of any of said secondary batteries becomes not larger than a prescribed value Z and then conducting charging, when any detected value is included in said region C.

* * * * *